Feb. 16, 1932.     A. DINA     1,845,490
COMPOUND FIRE SHUTTER AND FRAMING DEVICE
Filed July 25, 1929     4 Sheets-Sheet 1

INVENTOR
Augusto Dina
BY
Howard W——
ATTORNEY

Feb. 16, 1932.　　　　　A. DINA　　　　　1,845,490
COMPOUND FIRE SHUTTER AND FRAMING DEVICE
Filed July 25, 1929　　4 Sheets-Sheet 2

INVENTOR
Augusto Dina
BY
Howard W. Dix
ATTORNEY

Feb. 16, 1932.  A. DINA  1,845,490
COMPOUND FIRE SHUTTER AND FRAMING DEVICE
Filed July 25, 1929   4 Sheets-Sheet 3

INVENTOR
Augusto Dina
BY
Howard W. Dix
ATTORNEY

Feb. 16, 1932. A. DINA 1,845,490
COMPOUND FIRE SHUTTER AND FRAMING DEVICE
Filed July 25, 1929 4 Sheets-Sheet 4
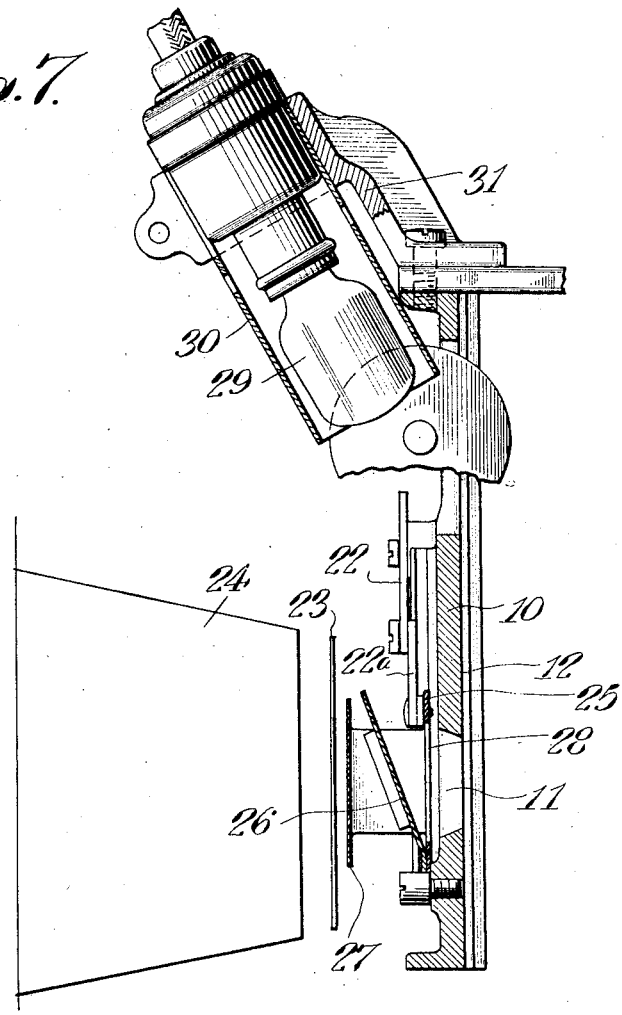
Fig. 7.
Fig. 8.
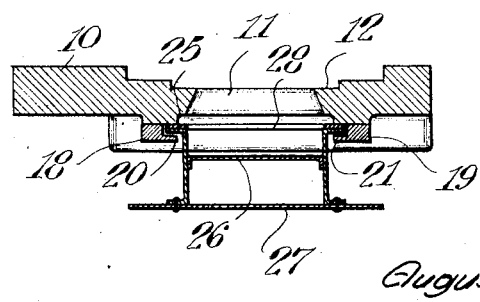
INVENTOR
Augusto Dina
BY
Howard W. Dix
ATTORNEY Patented Feb. 16, 1932

1,845,490

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

COMPOUND FIRE SHUTTER AND FRAMING DEVICE

Application filed July 25, 1929. Serial No. 380,836.

This invention relates to motion picture apparatus and has especial reference to a new and improved fire shutter therefor.

The main object of the invention is to combine in one simple, compact device the functions of both a fire shutter and, if desired, an associated framing cooperative device, which combined product or device is of light weight, easily operated automatically when the film is moved, is constructed to radiate and dissipate the heat of the light beam falling on it, and to permit the film, when it is stopped, to be framed accurately with respect to the film aperture opening without danger to the film catching fire while so doing.

Further and more specific objects, features, and advantages will more clearly appear from the detailed description given below when taken in connection with the accompanying drawings which form part of the specification and which illustrate a preferred embodiment of the invention.

Generally speaking, the invention comprises a simple, light-weight fire shutter operated automatically by the speed of the machine, in the usual manner and to be interposed across the aperture plate when the speed of the film is reduced below a predetermined value to prevent the film from catching fire, and composed of a plurality of light-weight spaced plates, which may be preferably disposed parallel with each other and slidable preferably vertically with respect to the aperture plate so as to be across the aperture opening in one position and either above it or below it in another position to permit projection. In some instances, one of the plates making up the product may be inclined from the vertical to act as a reflector and throw light received thereon in a direction through the aperture opening to pass through the film and enable it to be framed. The plates are preferably composed of some light weight metal, such as aluminum or other suitable material, and are connected in their spaced parallel relation by the simplest sort of a connection which will facilitate the light weight and yet permit the construction to be sufficiently rigid and readily adapted to carry out the function of a fire shutter. The plates may be composed of any desired material and their physical relations may be varied but their weight should be as light as possible to give proper and generous ventilating passages between them for the connection of the enclosed hot air, and one or more of them should be thin enough so as to quickly dissipate the heat falling on them.

The present preferred forms of the invention are shown in the drawings, in which, Fig. 1 is an elevation of the improved fire shutter mounted on the aperture plate of a motion picture machine;

Fig. 7 is a vertical section taken on the line 7—7 of Fig. 5; and,

Fig. 8 is a cross section taken on the line 8—8 of Fig. 5.

Figure 2:
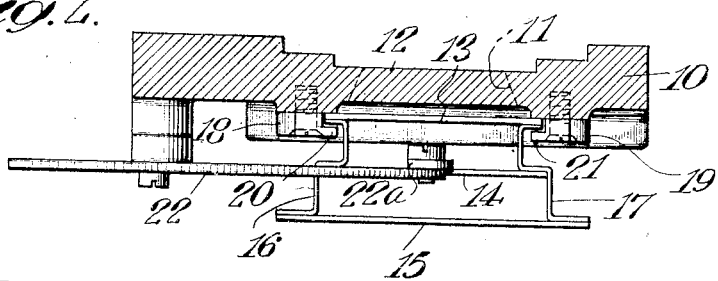
Fig. 2 is a cross section taken on the line 2—2 of Fig. 1.

In the drawings, a preferred form of the invention shown in Figs. 1-4 inclusive, is designed to be attached to the usual aperture opening plate such as 10, in the standard motion picture projection machine. In this plate, there is the usual aperture opening 11, and across it on the side 12 of the plate 10 there is disposed a fire shutter, which is preferably moved to a position across the opening when the speed of the film falls below a predetermined value. In the present instance, the fire shutter shown as constituting the invention comprises a plurality of parallel plates such as 13, 14, and 15 disposed parallel with the adjacent face of the aperture plate 10. These plates 13, 14, and 15 may be preferably made of light weight metal such as aluminum and may be held in their spaced relation by means such as connecting strips 16 and 17 which may be made of the same material and are preferably welded to the side edges of the plates 13, 14, and 15.

Figure 1:
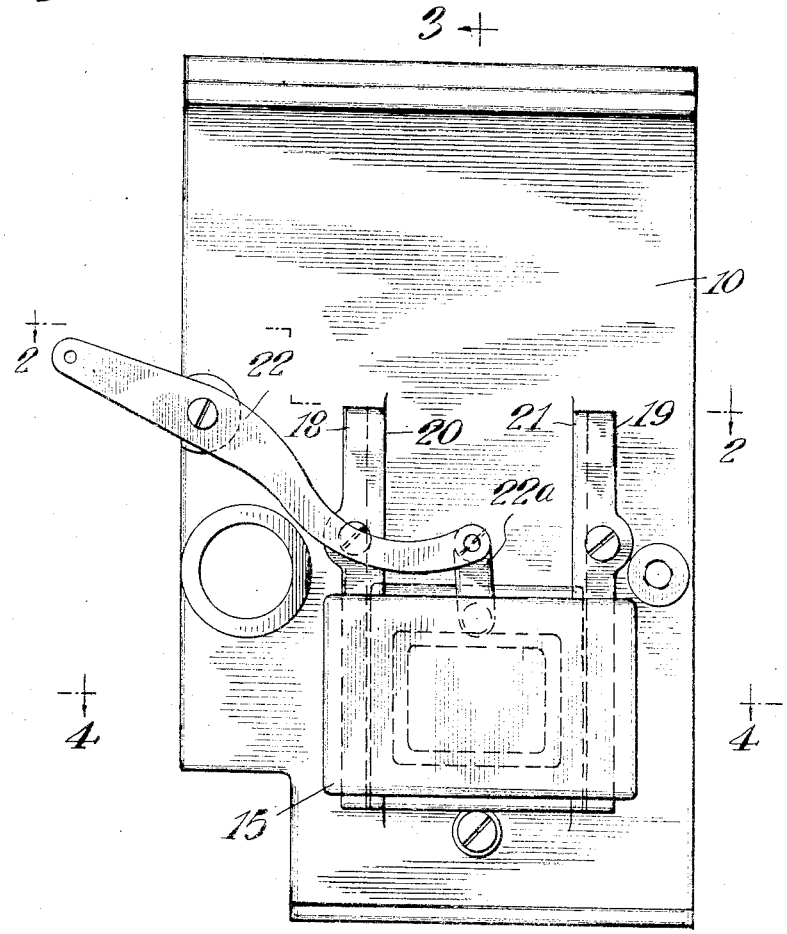

These plates may be made of any suitable material and connected in any desired manner but are preferably made of light weight metal and spaced in the manner shown so as to form a light weight fire shutter which is easily operated and which is provided with generously dimensioned passages between the plates for the quick and speedy dissipation of the heat falling on the plates from the beam of projection light in which the shutter is disposed when in its operative position shown in Fig. 1. By being made of thin material they also dissipate the heat more rapidly by radiation and by being generously spaced from the other plates an ample provision for dissipation of heat by convection is insured. The ratio of the plate thickness to the distance between plates is designed to be very large.

The lateral edges of the plate 13 are disposed to slide in grooves formed in guide plates 18 and 19 fastened to the face of the aperture plate 10. These guide plates have flanges 20 and 21 spaced from the plate 10 to thereby form the grooves. Any other suitable means for guiding the fire shutter in its movement up and down across the aperture 11 may be employed. Preferably the shutter through its middle plate 14 may be pivotally connected to the end of an arm 22 by link 22a. The arm 22 may be pivotally fastened to the aperture plate 10 and have the other end connected to any suitable mechanism whereby the arm is operated to lower the fire shutter when the speed of the film decreases below a certain minimum amount to prevent the ignition of the film. Any other means for operating the fire shutter may be employed without departing from the invention as contemplated. In the specific form of the invention shown in the drawings, it will be noticed that the plate 15 which lies nearest the source of the projection light is the largest in area and this is to provide the largest radiating surface to that plate which naturally becomes the hottest.

Figure 3:
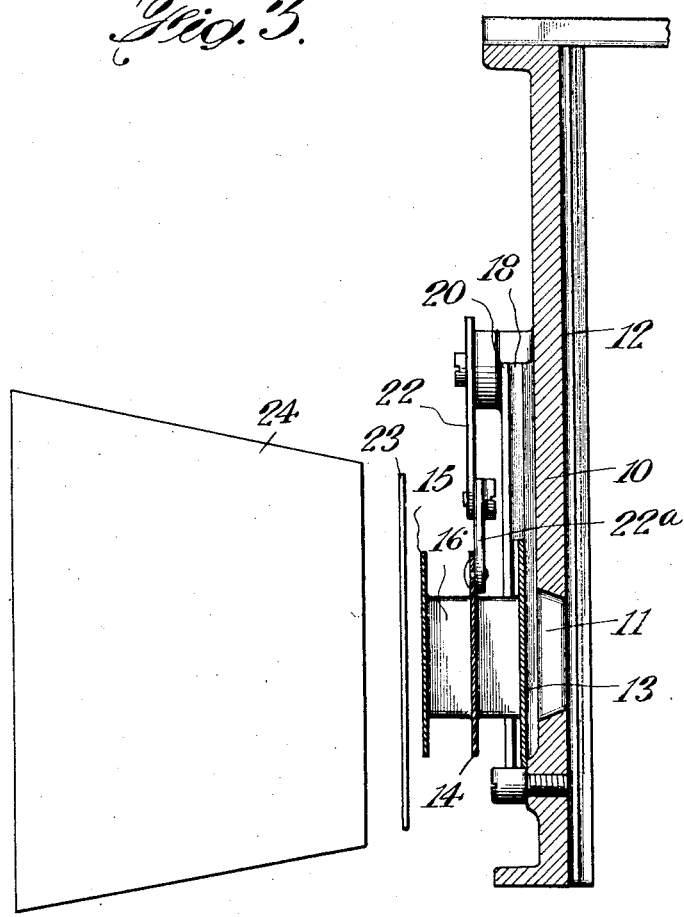
Fig. 3 is a vertical cross section taken on the line 3—3 of Fig. 1.
Figure 4:
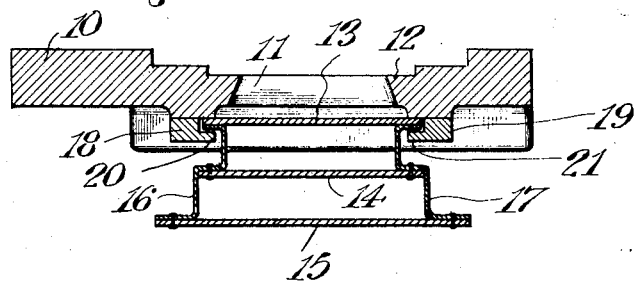
Fig. 4 is a cross section taken on the line 4—4 of Fig. 1.
Figure 6:
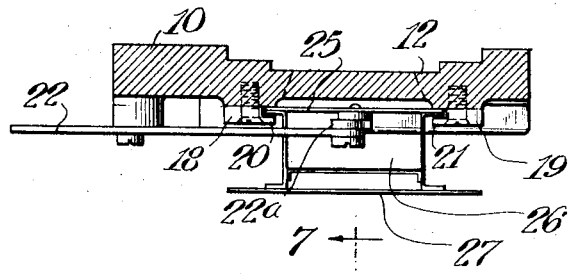
Fig. 6 is a cross section taken on the line 6—6 of Fig. 5.
Figure 5:
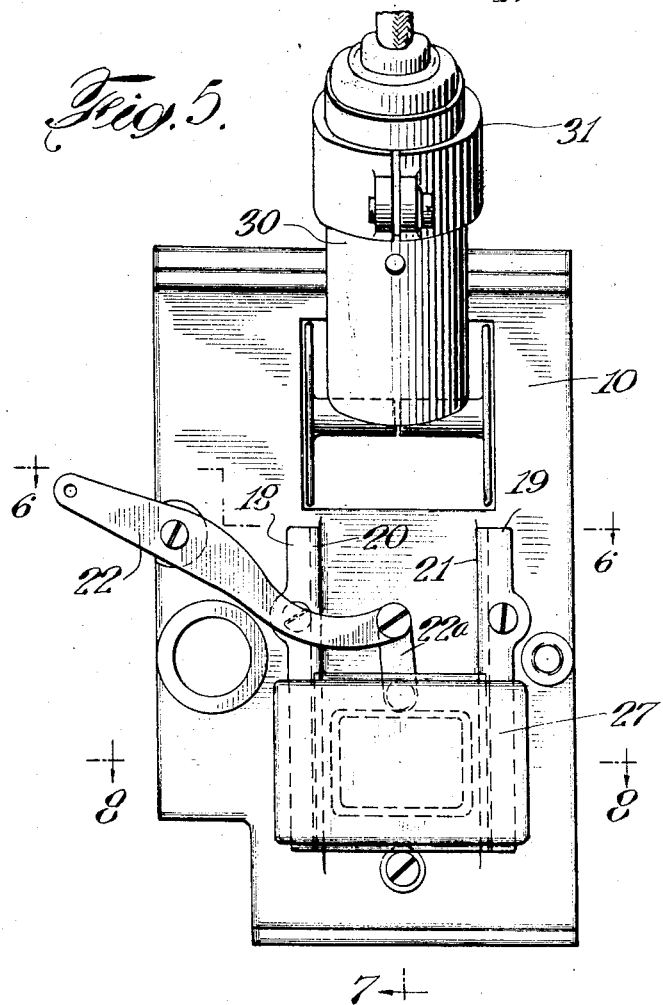
Fig. 5 is an elevation of a modified form of fire shutter and framing device combined.

In Fig. 3 it is seen that back of the fire shutter may be disposed the rotating shutter 23 and back of that is a light screen or guard 24 in the form of a cone which protects the eyes of the operator from injurious effects due to back reflection from the fire shutter and aperture plate and the regular shutter.

In the modified form of the invention shown in Figs. 5–8 inclusive, there is indicated the aperture plate 10 with the aperture 11 as before. The guide plates 18, 19, the arm 22, the regular shutter 23 and the light screen 24 are the same. The fire shutter in this modification may be formed of three or more plates such as 25, 26, and 27 as before, but in this form, the central plate 26 is inclined rearwardly and preferably upwardly as shown and has its forward surface highly polished or similarly treated to form and act as a reflector of any light received from above to throw it forward through the aperture 11 onto the film while the fire shutter is in its down or closed position so as to prevent fire and permit framing the film even while the light source is operating. It is of course apparent that the front plate 25 in this instance is provided with an aperture therein sufficient in size to permit of a proper area of light to project to the film from the reflector plate 26. Such an opening is indicated by the numeral 28. It is further to be noted that the front plate 25 may be the one which is backwardly inclined to act as a reflector.

In the form shown the arm 22 is connected to the top edge of the front plate 25. Otherwise the three plates 25, 26, and 27 are very similar to the plates 13, 14, and 15 and perform the same functions in radiating and dissipating the heat of the light beam.

With regard to the source of light whereby the reflecting surface of the plate 26 may be illuminated, it is immaterial what or where this source is as long as the light falls on the inclined surface of the plate 26 to be thrown forward through the aperture 11 on to the film. In the figures the source of light may be a lamp 29 located in a suitable housing or casing 30 and mounted in bracket 31 fastened to the top of the aperture plate 10. It is possible that the plate 26 be inclined rearwardly and downwardly and that the light source be located below the shutter or otherwise.

The main consideration involved in this invention are that a simple, compact, and light-weight fire shutter is provided which is so constructed and formed as to produce the maximum of radiation and dissipation of the heat received from the light beam and which may be operated quickly and easily when desired and automatically. In some instances this fire shutter will also act as a framing device which will permit the film sections to be easily and quickly framed while the shutter is in its closed position and even when the projection light is still on.

While the invention has been described in detail and with respect to a preferred form thereof, it is not desired to limit it to such forms or details since many changes and modifications may be made and the invention embodied in other forms without departing from the spirit and scope of the invention in its broader aspects. Hence it is desired to cover all forms and modifications coming within the language and scope of any one or more of the appended claims.

What is claimed, is,

1. A fire shutter comprising three spaced plates of light weight material connected together to provide substantially generous vertical ventilating passages therebetween for convection of air.

2. A fire shutter comprising three spaced plates of thin light weight metal connected together to provide substantially generous vertical ventilating passages therebetween for air convection.

3. A fire shutter comprising three spaced parallel plates of thin light weight aluminum connected together to provide substantially generous vertical ventilating passages therebetween for air convection and heat conduction.

4. In a fire shutter a plurality of spaced plates connected and movable as a unit, one of said plates inclined to the vertical to receive incident light and reflect it in a specified direction.

5. In a fire shutter a plurality of spaced plates connected and movable as a unit, one of said plates inclined to the vertical at such an angle as to throw incident light in a desired horizontal direction.

6. In combination with an aperture plate, a fire shutter of spaced light weight plates, one of which is disposed at an angle to the vertical to receive incident light and throw it through the aperture in the aperture plate.

7. In combination with an aperture plate, a fire shutter, made of light weight spaced connected plates of aluminum spaced apart a distance many times greater than their thickness, said shutter movably associated with the aperture plate, one of the plates of said shutter being inclined to the vertical sufficiently to receive incident light and direct it through the aperture in said aperture plate.

8. In combination with an aperture plate, a fire shutter comprising a plurality of spaced connected thin metal plates spaced apart a distance many times their thickness, one of said plates being apertured, the adjacent plate being inclined rearwardly and upwardly to receive incident light and throw it through the aperture in the adjacent plate.

9. In combination with an aperture plate, a fire shutter comprising a plurality of spaced connected thin metal plates spaced apart a distance many times their thickness, the forward plate being apertured, a middle plate being inclined to the vertical to act as a reflector to throw incident light through the aperture in the forward plate, a source of light disposed on the aperture plate and adapted to throw light on to said inclined plate, and means connected to one of said plates for moving said fire shutter with respect to the aperture plate.

10. In combination with an aperture plate having flanged guides, a fire shutter formed of three spaced connected plates of light thin metal disposed to slide along the aperture plate, edges of one of said plates being disposed under said guides for sliding movement.

11. In combination with an aperture plate having flanged guides, a fire shutter formed of three spaced connected plates of light thin metal disposed to slide along the aperture plate, edges of one of said plates being disposed under said guides for sliding movement, said last named plate being apertured, and the adjacent plate being inclined to receive and reflect incident light through the aperture plate.

AUGUSTO DINA.